United States Patent
Nicola (12)

(10) Patent No.: US 6,213,525 B1
(45) Date of Patent: Apr. 10, 2001

(54) LEVER ACTION FLOOR LATCH ACTUATION MECHANISM WITH CINCHING MECHANISM

(75) Inventor: Kirk M. Nicola, Beverly Hills, MI (US)

(73) Assignee: Magna Interior Systems Inc., Aurora (CA)

(*) Notice: Subject to any disclaimer, the term of this patent is extended or adjusted under 35 U.S.C. 154(b) by 0 days.

(21) Appl. No.: 09/310,592

(22) Filed: May 12, 1999

Related U.S. Application Data

(60) Provisional application No. 60/085,551, filed on May 15, 1998.

(51) Int. Cl.$^7$ ......................................................... E05C 3/16
(52) U.S. Cl. ......................... 292/223; 292/11; 296/65.03; 248/503.1
(58) Field of Search .................................. 292/11, 26, 30, 292/56, 116, 123, 97, 223; 296/65.03, 63; 248/503.1

(56) References Cited

U.S. PATENT DOCUMENTS

| 1,213,651 | * | 1/1917 | Johns | 292/97 |
|---|---|---|---|---|
| 1,946,714 | * | 2/1934 | Shafer | 292/283 |
| 4,773,693 | * | 9/1988 | Premji et al. | 292/11 |
| 4,836,597 | | 6/1989 | Izumida | 296/63 |
| 4,865,377 | | 9/1989 | Musser et al. | 296/65.1 |
| 4,962,955 | * | 10/1990 | Ferrara et al. | 292/225 |
| 5,372,398 | | 12/1994 | Aneiros et al. | 296/65.1 |
| 5,547,242 | | 8/1996 | Dukatz et al. | 296/65.1 |
| 5,562,322 | * | 10/1996 | Christoffel | 296/65.1 |
| 5,662,368 | * | 9/1997 | Ito et al. | 296/65.1 |
| 5,671,965 | * | 9/1997 | O'Connor | 296/65.1 |
| 5,765,894 | * | 6/1998 | Okazaki et al. | 296/65.1 |

FOREIGN PATENT DOCUMENTS

2092659 * 8/1982 (GB) ...................... 292/283

* cited by examiner

Primary Examiner—Lynne H. Browne
Assistant Examiner—John B. Walsh
(74) Attorney, Agent, or Firm—Howard & Howard

(57) ABSTRACT

A lever action floor latch actuation mechanism for removably securing a seat to a pair of front and rear strikers on the floor of a vehicle. A riser having a forward leg and a rearward leg supports the seat above the vehicle floor. Front and rear latches are pivotally connected to the forward and rearward legs, respectively, for releasably securing the seat to the strikers. A longitudinal links pivotally interconnects the front and rear latches and an actuation member coupled to the link simultaneously moves the latches between a latched position engaging the strikers and an unlatched position disengaging the strikers. Each latch includes a cinch cam pivotally connecting the latch to the riser. The cinch cam has a cylindrical outer surface terminating at a flattened cam surface. A spacer plate is fixedly secured between the latch and the riser and includes a center aperture for rotatably receiving the cinch cam. The aperture forms a circular section and a tangential slot for seating a flexible plate. The cylindrical surface of the cam engages and flexes the plate when the latch is pivoted to the latched position providing an anti-rattle biasing force between the latch and striker and the flattened surface release the flex in the plate when the latch is pivoted to the unlatched position disengaged from the striker.

7 Claims, 4 Drawing Sheets

LEVER ACTION FLOOR LATCH ACTUATION MECHANISM WITH CINCHING MECHANISM

RELATED APPLICATION

This patent application claims priority to and all the benefits of U.S. Provisional Patent Application Ser. No. 60/085,551 which was filed on May 15, 1998 and entitled "Lever Action Floor Latch Actuation Mechanism with Cinching Mechanism".

BACKGROUND ART

1. Field of Invention

This invention relates to a lever action floor latch actuation mechanism. In particular, this invention relates to a lever action floor latch actuation mechanism having a floor striker cinching mechanism.

2. Background of Invention

The floor latch release handles of some removable bench seats for vehicles have been found to be bulky and obtrusive by the user. The handle may be bulky for strength and robustness due to relatively high efforts required to engage and disengage the floor latches. Further, the handle is usually located in a visible area so that the user has easy access to it. However, the handles often protrude into the cargo and/or comfort areas of the vehicle. Some latch handles may have somewhat poor ergonomics due to the motion required by the mechanism. Cost constraints may drive the need for simplicity of design at the sacrifice of improved ergonomics.

Current seating technology for removable seats often utilize a device known throughout the industry as an "anti-rattle" latch. This device is intended to be the wedge component of the latching system which includes the non-contacting structural latch. The anti-rattle latch engages and contacts a floor striker which is usually a horizontally mounted pin. The structural latch engages but usually does not contact the floor striker.

The purpose of the anti-rattle latch is to grip onto the vehicle floor striker with sufficient force to securely fasten the seat. One problem that occurs with the anti-rattle latch is that the effort to disengage the latch from the floor striker can be relatively high because of its wedging action. Another problem that can occur with the anti-rattle latch is that it sometimes does not hold the seat securely to the floor striker upon reinstallation because sufficient wedging has not occurred, sometimes due to dimensional tolerance variation. In other cases, grooves are required in the floor striker to aid the anti-rattle latch in preventing lateral movement across the floor striker during dynamic conditions of the vehicle.

Cost usually is not a significant factor for an anti-rattle latch or other similar mechanism types. Some type of device is required to hold the seat securely to the vehicle floor strikers.

The disadvantages of the prior art may be overcome by providing a floor latch release handle which improves as many of the conditions as stated in the problem.

It is desirable to provide a handle which when the handle is in the latched position, would minimally invade the cargo and/or comfort areas, yet would be easily visible and accessible.

It is desirable to provide a handle having improved ergonomics wherein the balance of the handle shape and improved mechanical advantage provide reduced efforts to optimize ergonomics.

It is desirable to provide a latch mechanism which grips tightly to the floor strikers with a relatively high force, compensates for dimensional variability and contains an optimally high friction coefficient member would provide an improved method of securing the seat.

SUMMARY OF THE INVENTION

According to one aspect of the invention, there is provided a lever action floor latch actuation mechanism for removably securing a seat to a pair of front and rear strikers on the floor of a vehicle. The mechanism comprises a riser having a forward leg and a rearward leg for supporting the seat above the vehicle floor. A front latch is pivotally coupled to the forward leg for releasably securing the seat to the front strikers and a rear latch is pivotally coupled to the rearward leg for releasably securing the seat to the rear striker. A link has a first end pivotally connected to the front latch and a second end pivotally connected to the rear latch. An actuation member is operatively connected to the link for simultaneously moving each of the front and rear latches between a latched position for engaging the strikers and an unlatched position for disengaging the strikers. The actuation member includes a handle pivotally coupled to the riser for pivoting the actuation member between a first position with the latches in the latched position and a second position with the latches in the unlatched position, a pinion coupled between the handle and the link for moving the latches between the latched and unlatched positions in response to pivotal movement of the handle between the first and second positions, and a lock operatively connected between the handle and the pinion for locking the actuation member in each of the first and second positions.

According to another aspect of the invention, there is provided a latch for removably securing a seat to a striker on the floor of a vehicle. The latch comprises a cinch cam for pivotally connecting the latch to the seat and providing pivotal movement of the latch between a latched position for engaging the striker and an unlatched position for disengaging the striker. The cinch cam has a generally cylindrical outer surface terminating at a generally flattened cam surface. A spacer plate is adapted to be fixedly secured between the latch and the seat. The spacer plate has an aperture for rotatably receiving said cinch cam there through. The aperture has a generally circular section and a tangential slot. A flexible plate is seated in the tangential slot wherein the cylindrical surface of the cinch cam engages and flexes the plate when the latch is pivoted to the latched position providing a biasing force of the latch engaging the striker and the flattened surface releases the flex in the plate when the latch is pivoted to the unlatched position disengaging the striker.

BRIEF DESCRIPTION OF THE DRAWINGS

Other advantages of the present invention will be readily appreciated as the same becomes better understood when considered in connection with the accompanying drawings wherein.

DETAILED DESCRIPTION OF THE INVENTION

Figure 1:
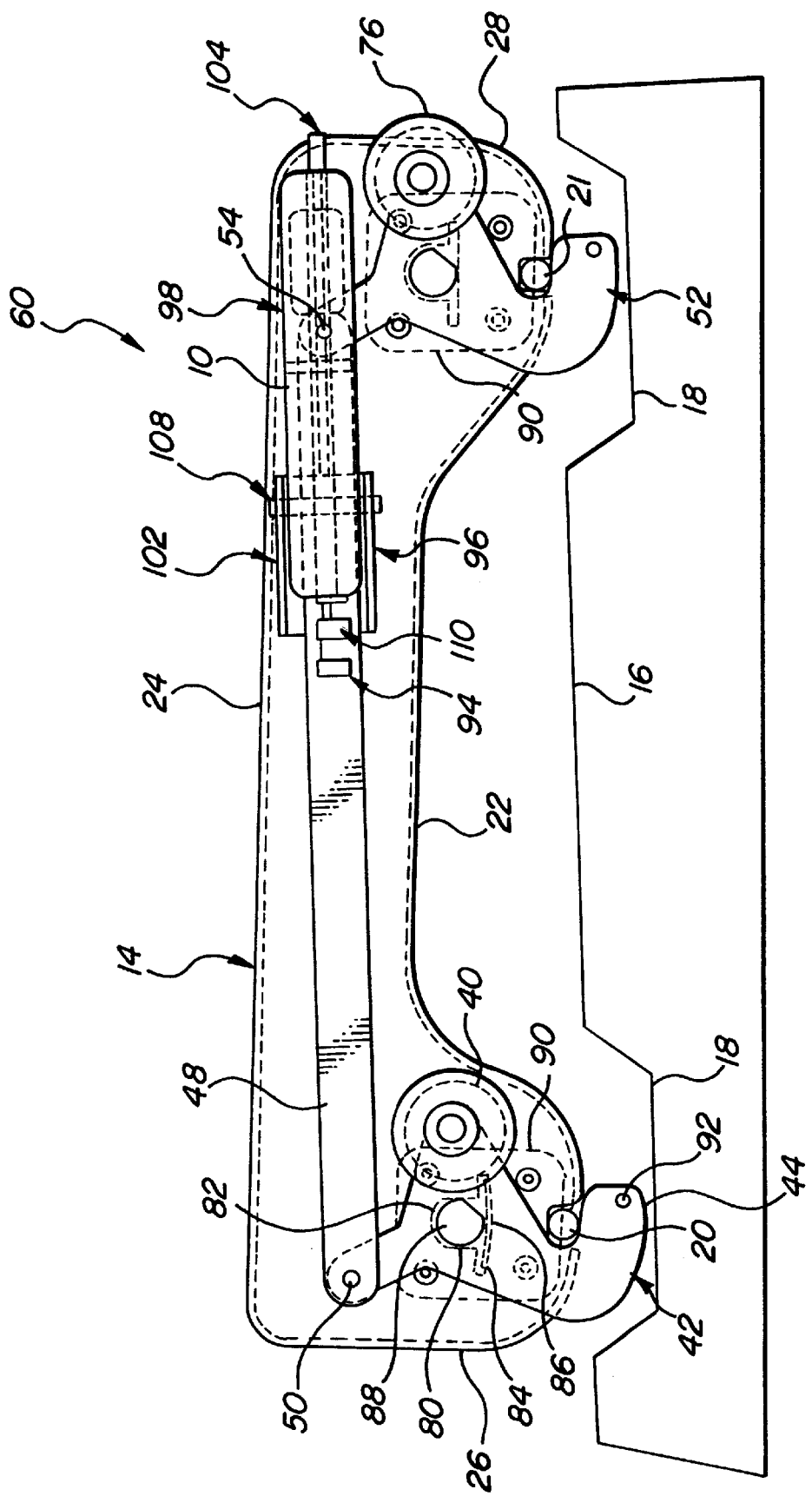
FIG. 1 is a side elevational view of the latch actuation mechanism of the present invention.
Figure 2:
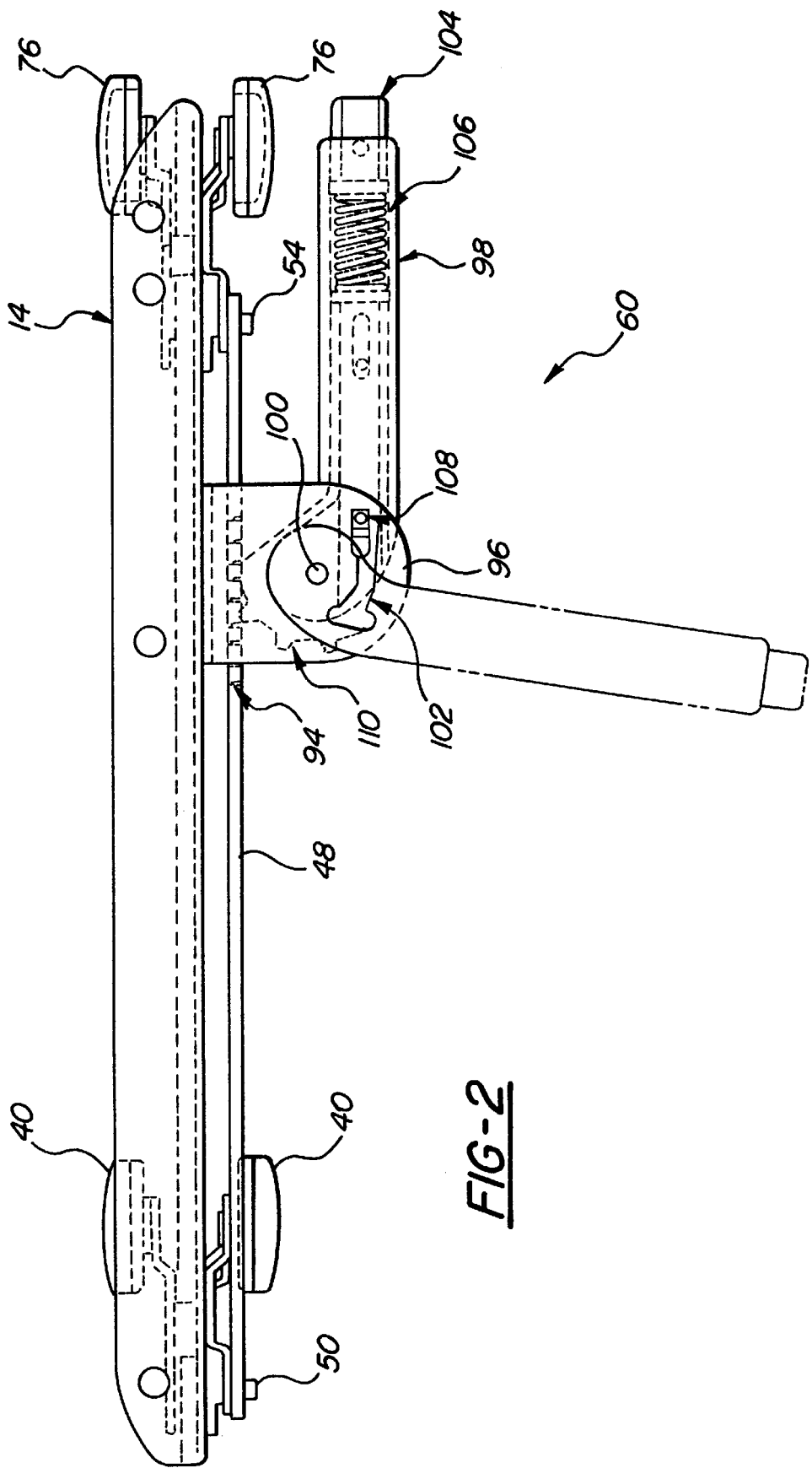
FIG. 2 is a top plan view of the mechanism of FIG. 1, illustrated in a locked position and an unlocked position in phantom lines.
Figure 3:
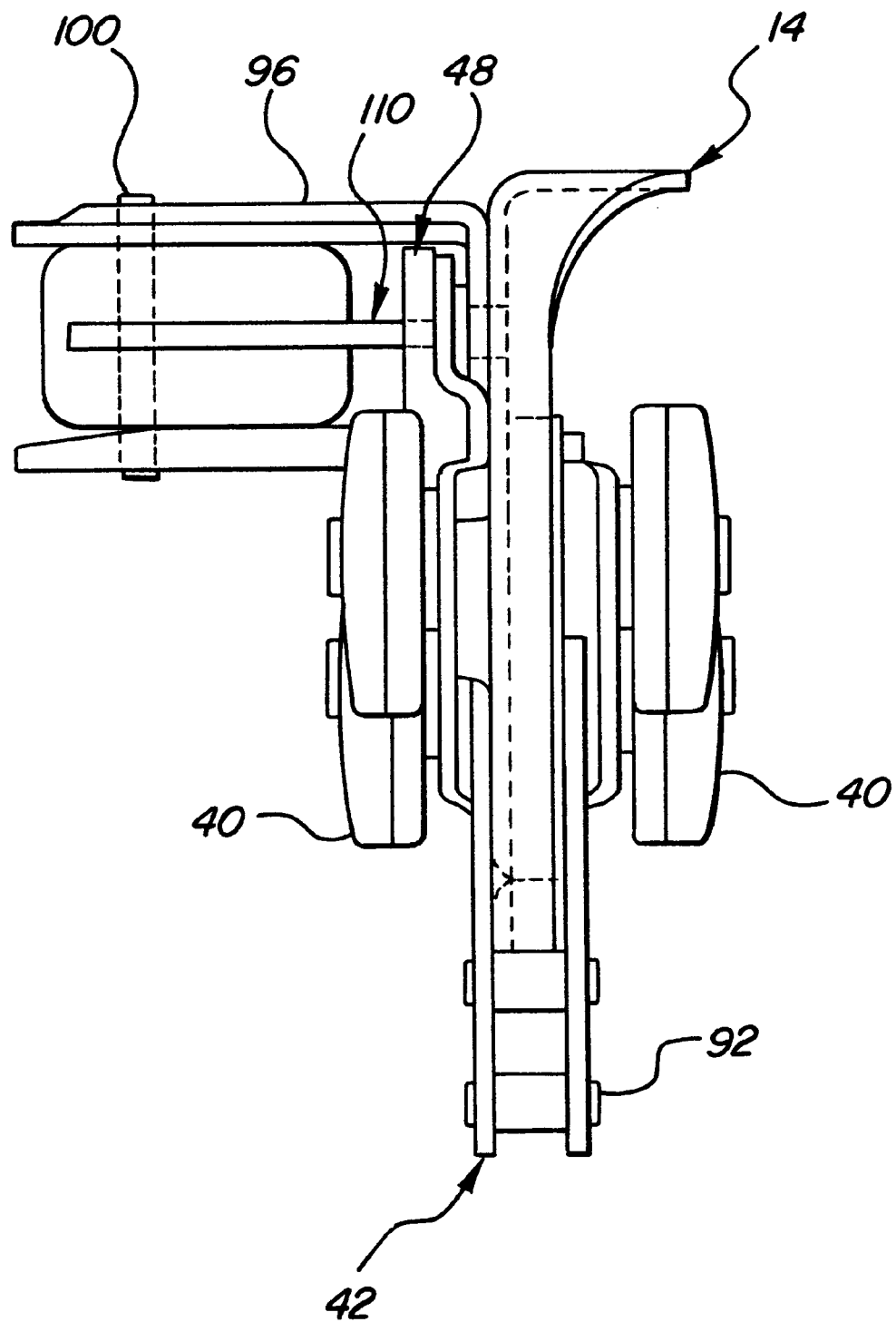
FIG. 3 is a front elevational view of the mechanism of FIG. 1, illustrated in a locked position.

Referring to FIG. 1, a lever action latch actuation mechanism for removably securing a seat to a pair of front 20 and rear 21 strikers on the floor 16 of a vehicle is generally shown at 10. The mechanism 10 is mounted on a riser 14. The riser 14 has front and rear latches which releasably connect the riser 14 to the floor 16 of the vehicle. The floor 16 has a recessed sub-floor 18 in which front 20 and rear 21 strikers are mounted for supporting the seat above the vehicle floor 16. The use of strikers mounted in channels is more fully described in U.S. Pat. No. 5,372,398, the contents of which are incorporated herein by way of reference.

The riser 14 has a flange 22 on each side of an upper support platform 24. The flanges 22 are generally the same on each side of the riser 14 and thus only one side need be described. Each flange 22 comprises a forward leg 26 and rearward leg 28 for supporting the seat above the vehicle floor. Front and rear latches 42 and 52 are pivotally mounted on forward leg 26 and rearward leg 28, respectively.

The front latch 42 is made from sheet steel and has three arms radiating from a central body. One arm is a J-shaped hook and positioned to hook onto front striker 20 from a forwardly direction. A wheel 40 is rotatably mounted an a second arm. A longitudinally extending link 48 has a first end pivotally connected to the third arm at pin 50 of the front latch 42 and a second end pivotally connected to the rear latch 52.

A spacer plate 90 is rigidly mounted onto the forward leg 26 and positioned between the latch 42 and forward leg 26. The spacer plate 90 includes an aperture 80 which has a central generally circular section 82 with a tangentially extending slot 84. A flexible plate or cinch spring 86 is seated in and extends along the slot 84 to provide an anti-rattle biasing force F as will be discussed below. A cinch cam 88 is connected to the latch 42 for rotation therewith and pivotally connects the latch 42 to the forward leg 26 for pivotal movement between a latched position for engaging the striker 20 and an unlatched position for disengaging the striker 20. A second spacer 90 can be provided on the opposite surface of the forward leg 26 to improve rigidity of the leg 26. Additionally, a second latch 42 could be integrated by spacer 92 with the first latch 42 on opposite sides of the leg 26 for unitary motion.

Figure 4:
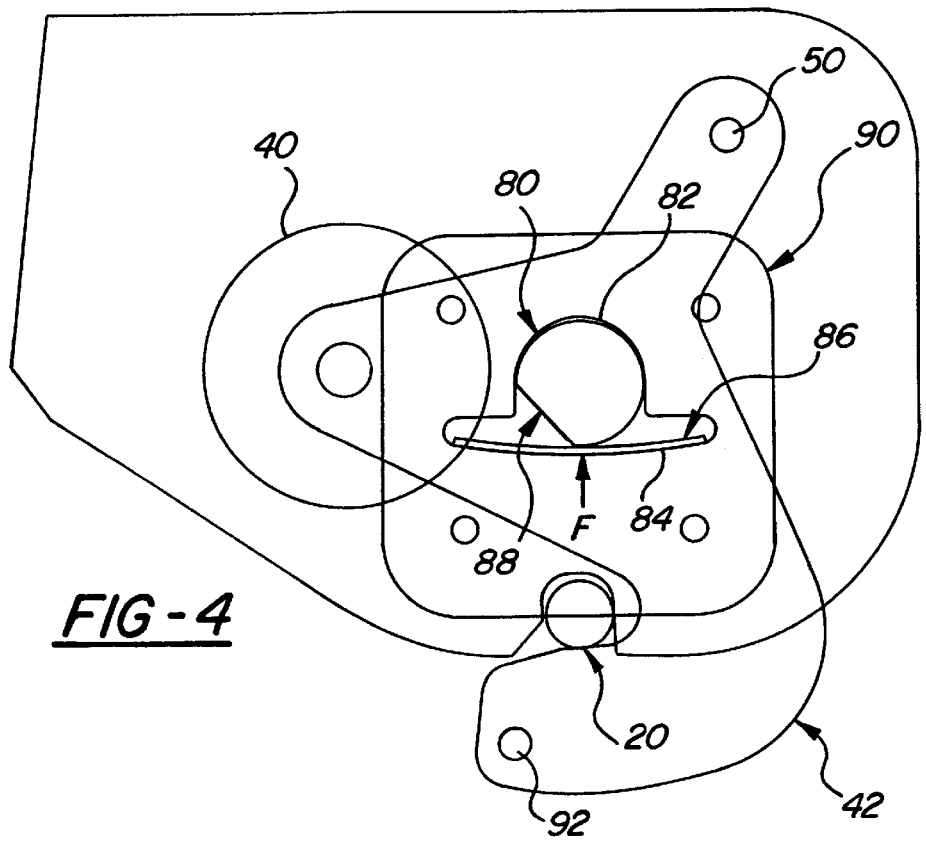
FIG. 4 is a side elevational view of a cinching mechanism for the embodiment of FIG. 1, with the latch in a locked position.
Figure 5:
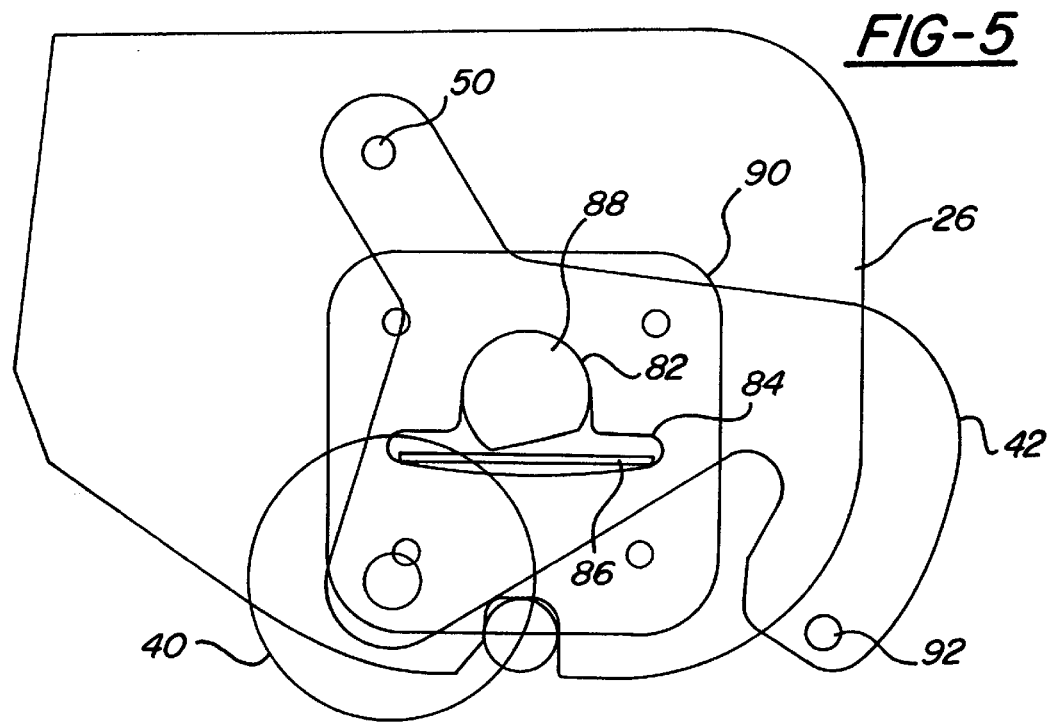
FIG. 5 is a side elevational view of the cinching mechanism of FIG. 4, with the latch in an unlocked position.

The cinch cam 88 preferably has a cylindrical outer surface terminating at a flattened cam surface. The cinch cam 88 is received through the aperture 80 of the spacer plate 90. In the unlocked position as illustrated in FIG. 5, the cinch cam 80 will be slightly spaced from the cinch spring 86. As the cinch cam 88 rotates, the cylindrical outer surface will engage the cinch spring 86. Further rotation of cinch cam 88, as illustrated in FIG. 4, will cause the cinch spring 86 to bend, or flex, and produce an anti-rattle force F which will cinch the latch 42 firmly onto the striker 20 when the latch 42 is pivoted to the latched position. Preferably, the flattened cam surface is spaced from the cinch spring 86 when the mechanism 10 is in the unlocked position. The corner of the flattened cam surface initially engages the cinch spring 86 to bend the cinch spring 86 when the mechanism 10 is moving to the locked position. The flattened surface will release the flex in the spring 86 when the latch 42 is pivoted back to the unlatched position. Although not specifically shown, the cinch cam 88 may be completely cylindrical and the circular section 82 of the aperture 80 may be elongated without deviating from the overall scope of the subject invention. With this alternative configuration, the cinch cam 88 would seat within the top of the circular section 82 spaced from the spring 86 when the mechanism 10 is in the unlocked position. When the mechanism 10 moves to the locked position, the cinch cam 88 would move downward to engage and bend the cinch spring 86.

The link 48 is pivotally connected to the forward latch 42 at pin 50. The link 48 extends rearwardly to rear latch 52 and is pivotally connected at pin 54. The link 48 has a series of apertures 94 or a rack construction extending longitudinally there along. Forward latch 42 and rearward latch 52 are identical in construction and the link 48 gangs the forward latch 44 to the rearward latch 52 for cooperative movement.

An actuation member 60 is operatively connected to the link 48 for simultaneously moving the front 42 and rear 52 latches between the latched and unlatched positions. The actuation member 60 has a U-shaped bracket 96 mounted to the inwardly facing surface of the flange 22. A handle 98 is pivotally mounted within the arms of bracket 96 at pin 100. The bracket 96 has a slot 102 for releasably locking the handle 98 in either a locked position or the unlocked position. The slot 102 has an arcuate section extending between a first straight section and a second straight section at opposite ends of the slot 102. The straight sections will extend longitudinally of the handle 98 in the respective locking position and unlocking positions.

The handle 98 has a lock button 104 which is biased by spring 106. Slidably mounted within the handle is a rod 108 with a hooked end for sliding in slot 102 in a cam relation. The rod 108 is connected to the button 104. The handle 98 has a pinion forming a series of circumferentially spaced teeth 110 which are positioned to engage the series of apertures 94 in a rack and pinion type relation to transfer the pivotal movement of the handle 98 between first and second positions to linear movement of the link 48 pivoting the latches 42,52 between the latched and unlatched positions.

To lock or unlock the floor latches, the operator pushes the lock button 104 in and rotates the handle 98 rearward or forward respectively between the first and second positions. The lock button 104 will urge the rod 108 to slide along the first straight section of the slot 102 to the arcuate section to allow the handle 98 to rotate. The rack and pinion engagement causes the link 48 to move forwardly or rearwardly, respectively, which simultaneously causes the latches 42, 52 to rotate together between the latched position and the unlatched position. Once the rod 108 reaches the opposite, second straight section, the bias of the spring 106 will cause the rod 108 to retract into the second straight section to lock the handle 98 in place.

Optionally, an indicator could be incorporated which is visible through a viewing window located at the top end of the handle 98, which indicator would display whether the handle 98 is fully locked and unlocked. Once the handle 98 is locked, it will not unlock unless the lock button 104 is pushed. The locked position is very robust by design and provides superior safety.

Finally, once the latches 42,52 are pivoted to the unlatched position, the wheels 40 extend below the forward 26 and rearward 28 legs for movably supporting the seat in a roll-away position.

The invention has been described in an illustrative manner, and it is to be understood that the terminology used is intended to be in the nature of words of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A lever action floor actuation mechanism for removably securing a seat to a pair of front and rear strikers on the floor of a vehicle, said mechanism comprising:

a riser for supporting the seat above the vehicle floor, said riser having a forward leg and a rearward leg;

a front latch pivotally coupled to said forward leg for releasably securing the seat to the front strikers;

a rear latch pivotally coupled to said rearward leg for releasably securing the seat to the rear striker;

a link having a first end pivotally connected to said front latch and a second end pivotally connected to said rear latch;

an actuation member operatively connected to said link for simultaneously moving each of said front and rear latches between a latched position for engaging the strikers and an unlatched position for disengaging the strikers;

said actuation member including a pinion operatively coupled to said link, a handle operatively connected to said pinion for movement between a first position and a second position, and a lock operatively connected to said handle for releaseably locking said handle in said first and second positions, said latches being placed in said latched position when said handle is in said first position and said latches being placed in said unlatched position when said handle is in said second position.

2. A mechanism as set forth in claim 1 wherein said link includes a rack of apertures and said pinion includes a series of teeth positioned to engage said apertures and transfer said pivotal movement of said handle between said first and second positions to linear movement of said link pivoting said latches between said latched and unlatched positions.

3. A mechanism as set forth in claim 2 further including a bracket connecting said actuation member to said riser and pivotally mounting said handle between said first and second positions.

4. A mechanism as set forth in claim 3 wherein said bracket includes a slot operatively connected to said lock for releasably locking said handle in each of said locked and unlocked positions.

5. A mechanism as set forth in claim 4 wherein said lock includes a rod extending through a longitudinal opening in said handle between a lock button extending outwardly from said handle and a second hooked end for sliding in said slot.

6. A mechanism as set forth in claim 5 wherein said slot includes an arcuate section extending between a first straight section and a second straight section for slidingly receiving said hooked end.

7. A mechanism as set forth in claim 6 wherein said lock includes a spring seated between said rod and said lock button for biasing said hooked end in said first straight section to lock said actuation member in said first position when said latches are in said latched position and for biasing said hooked end in said second straight section to lock said actuation in said second position when said latches are in said unlatched position.

* * * * *